Feb. 19, 1929.
T. E. POWERS ET AL
1,702,946
SAFETY CARGO HOOK
Filed June 18, 1928
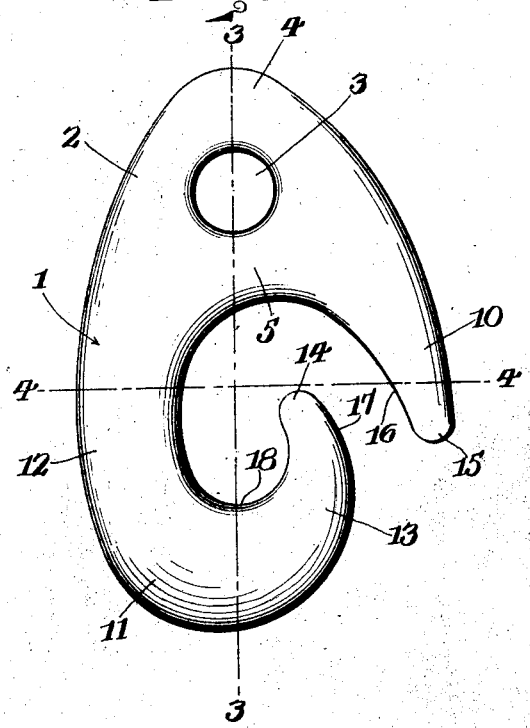
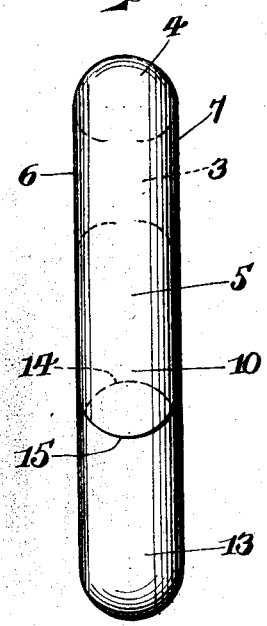
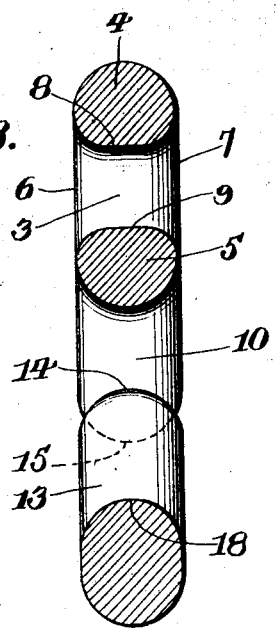
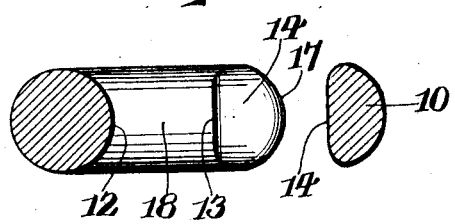
INVENTOR.
Thomas E. Powers,
BY AND William J. Frain,
Geo. P. Kimmel ATTORNEY.

Patented Feb. 19, 1929.

1,702,946

UNITED STATES PATENT OFFICE.

THOMAS E. POWERS AND WILLIAM J. FRAIN, OF SAVANNAH, GEORGIA.

SAFETY CARGO HOOK.

Application filed June 18, 1928. Serial No. 286,459.

This invention relates to a safety cargo hook and has for its primary object to provide in a manner as hereinafter set forth, a hook for the purpose of expeditiously loading or unloading cargo and for other lifting purposes.

A further object of the invention is to provide a hook for the purpose above set forth which will not foul or entangle with foreign objects, thereby eliminating any possibility of the load being inadvertently released, and consequently securing the load against damage from falling, promoting speed in the loading or unloading operation, and eliminating the danger of injury to the laborers in the loading or unloading operation.

A further object of the invention is to provide a hook possessing the advantages as aforesaid, which is of integral construction and which includes as a part thereof, a tongue disposed in spaced, overlapping relation to the hook bill for the protection of the latter.

Other objects and advantages will be apparent during the course of the following description.

In the accompanying drawings in which like numerals are employed to designate like parts throughout the same, Figure 1 is a side elevation of a hook constructed in accordance with this invention.

Figure 2 is a front elevation thereof.

Figure 3 is a section taken on line 3—3 of Figure 1.

Figure 4 is a section taken on line 4—4 of Figure 1.

In the drawings wherein for the purpose of illustration is shown an embodiment of our invention the numeral 1 designates generally our improved hook, which is a unitary structure and which is preferably formed of pure steel throughout. The upper portion 2 of the hook 1 is of substantially semi-elliptical contour and is formed centrally thereof with a circular eye 3, which extends transversely through the portion 2 for the reception of a shackle or bolt not shown, to secure the hook to a cable or the like. The portion 2 is of such thickness that the parts 4 and 5 thereof, respectively located above and below the eye 3 are substantially three-quarters circular in cross section. The ends 6 and 7 of the eye 3 are flared as shown in Figure 2, thereby providing the opposing faces 8 and 9 of the parts 4 and 5 with rounded corners. The forward edge of the portion 2 merges into a tongue 10, which will be hereinafter more particularly described, and the purpose of which will be hereinafter explained.

The lower portion 11 of the hook 1 consists of a curved shank 12 which merges into a curved bill 13 and constitutes the means with which the hook is engaged with the load. The free end 14 of the bill 13 is inclined upwardly and rearwardly as clearly shown in Figure 1. The bill 13 is substantially oval in cross section at its point of mergence with the shank 12, and said cross section is gradually reduced in area from said point of mergence to the free end 14, due to the tapered formation of the bill. The shank 12 is substantially oval in cross section throughout.

The tongue 10 projects forwardly beyond the forward plane of the bill 13 and depends downwardly below the upper horizontal plane thereof. The tongue 10 tapers toward the free end 15 thereof and is substantially three-quarters oval in cross section as clearly shown in Figure 4. The tongue 10 is disposed in spaced, overlapping relation to the bill 13, with the lowermost portion of the rear wall 16 of the tongue 10 extending in parallel relation to the uppermost portion of the forward wall 17 of the bill 13. The spaced, overlapping relation of the tongue 10 and bill 13 provides an arcuate inlet to the upper surface 18 of the merging bill 13 and shank 12. The surface 18 provides the seat for the load when the hook 1 is engaged therewith.

It is to be understood that the form of the invention herewith shown and described is to be taken as the preferred example of the same and that various changes in the size, shape and arrangement of parts may be resorted to without departing from the spirit of the invention or the scope of the appended claims.

What we claim is:

1. A safety hook comprising upper and lower integral portions, said lower portion consisting of a curved shank merging into a forwardly and upwardly curved bill to provide a seat for a load to be engaged by the hook, said upper portion being formed with an eye for engagement with a hoisting apparatus and merging into a stationary tongue which projects forwardly of the forward vertical plane of said bill, and which further depends downwardly below the upper horizontal plane of said bill.

2. A safety hook comprising upper and lower integral portions, said lower portion consisting of a curved shank merging into a forwardly and upwardly curved bill to provide a seat for a load to be engaged by the hook, said upper portion being formed with an eye for engagement with a hoisting apparatus and merging into a stationary tongue which projects forwardly of the forward vertical plane of said bill, and which further depends downwardly below the upper horizontal plane of said bill, the free end of said bill being inclined upwardly and rearwardly.

3. A safety hook comprising upper and lower integral portions, said lower portion consisting of a curved shank merging into a forwardly and upwardly curved bill to provide a seat for a load to be engaged by the hook, said upper portion being formed with an eye for engagement with a hoisting apparatus and merging into a stationary tongue which projects forwardly of the forward vertical plane of said bill, and which further depends downwardly below the upper horizontal plane of said bill, said tongue and bill being gradually reduced in cross sectional area towards their free ends to present their opposing, overlapping faces in parallel relation.

4. A safety hook comprising upper and lower integral portions, said lower portion consisting of a curved shank merging into a forwardly and upwardly curved bill to provide a seat for a load to be engaged by the hook, said upper portion being formed with an eye for engagement with a hoisting apparatus and merging into a stationary tongue which projects forwardly of the forward vertical plane of said bill, and which further depends downwardly below the upper horizontal plane of said bill, said tongue and bill providing therebetween an upwardly extending arcuate inlet to said seat.

5. A safety hook comprising upper and lower integral portions, said lower portion consisting of a curved shank merging into a forwardly and upwardly curved bill to provide a seat for a load to be engaged by the hook, said upper portion being formed with an eye for engagement with a hoisting apparatus and merging into a tongue which projects forwardly of the forward vertical plane of said bill, and which further depends downwardly below the upper horizontal plane of said bill, said tongue and bill being permanently spaced and having opposing face portions disposed in parallel relation to provide an upwardly extending, arcuate inlet of constant proportions to said seat.

In testimony whereof, we affix our signatures hereto.

THOMAS E. POWERS.
WILLIAM J. FRAIN.